(12) United States Patent
Cooke et al.

(10) Patent No.: US 10,893,754 B1
(45) Date of Patent: Jan. 19, 2021

(54) MODULAR AND ADJUSTABLE HEADREST

(71) Applicants: Jay Patrick Cooke, Oshkosh, WI (US); Benjamin Templeton Cooke, Los Angeles, CA (US)

(72) Inventors: Jay Patrick Cooke, Oshkosh, WI (US); Benjamin Templeton Cooke, Los Angeles, CA (US)

( * ) Notice: Subject to any disclaimer, the term of this patent is extended or adjusted under 35 U.S.C. 154(b) by 0 days.

(21) Appl. No.: 16/845,034

(22) Filed: Apr. 9, 2020

(51) Int. Cl.
*A47C 16/00* (2006.01)
*F16M 13/04* (2006.01)

(52) U.S. Cl.
CPC .............. *A47C 16/00* (2013.01); *F16M 13/04* (2013.01)

(58) Field of Classification Search
CPC ......... A47C 16/00; A47C 7/383; F16M 13/04
See application file for complete search history.

(56) References Cited

U.S. PATENT DOCUMENTS

| | | | | |
|---|---|---|---|---|
| 1,260,929 | A * | 3/1918 | Maxcy | A47C 7/383 297/394 |
| 2,897,878 | A | 8/1959 | Mungovan | |
| 3,380,694 | A | 4/1968 | Branner | |
| 3,578,383 | A | 5/1971 | Earl | |
| RE29,811 | E | 10/1978 | Norris | |
| 4,565,408 | A | 1/1986 | Palley | |
| 4,565,409 | A * | 1/1986 | Hollonbeck | A47C 16/00 297/411.1 |
| 4,617,691 | A | 10/1986 | Monti et al. | |
| 4,679,262 | A | 7/1987 | Davis et al. | |
| 4,776,049 | A | 10/1988 | Perron | |
| 5,097,551 | A | 3/1992 | Smith | |
| 5,303,890 | A * | 4/1994 | Carruth | A47C 20/026 248/118 |
| 5,470,038 | A * | 11/1995 | Clark | A45B 5/00 248/156 |
| 6,231,535 | B1 | 5/2001 | Mainiero et al. | |
| 6,270,160 | B1 * | 8/2001 | Blake | A47C 7/383 297/393 |

(Continued)

FOREIGN PATENT DOCUMENTS

| | | |
|---|---|---|
| AU | 588783 B | 9/1989 |
| AU | 588783 B3 | 9/1989 |

(Continued)

*Primary Examiner* — Bradley Duckworth
(74) *Attorney, Agent, or Firm* — IP Authority, LLC; Ramraj Soundararajan

(57) ABSTRACT

A headrest is described having a vertically adjustable element, an adjustable lap rest, and a cup. The vertically adjustable element has a lower end and an upper end, where the vertically adjustable element has a height, $h_1$, when fully extended and has a height, $h_2$, when collapsed, where $h_2<h_1$. The adjustable lap rest element has a first portion that is attached to the lower end of the vertically adjustable element and has a second portion comprising a fold-out. The fold-out, in a horizontal configuration, functions as a lap rest and, in a vertical configuration, functions to increase the height of the headrest, when fully extended, from the height, $h_1$, to height $h_1+h_3$. The cup is attached to the upper end of the vertically adjustable element, where the cup has an angularly adjustable mechanism. A modular version of the headrest and a kit storing the headrest are also described.

15 Claims, 6 Drawing Sheets

(56) References Cited

U.S. PATENT DOCUMENTS

| | | | |
|---|---|---|---|
| 6,427,273 B1 * | 8/2002 | Berke | A47G 9/1009 5/657 |
| 6,641,221 B1 | 11/2003 | Kastlunger | |
| 6,811,222 B1 | 11/2004 | Sumner | |
| 6,893,097 B1 * | 5/2005 | Ebensperger | A47C 9/10 297/16.2 |
| 6,938,958 B2 | 9/2005 | Gold | |
| 6,973,691 B1 | 12/2005 | Cordova et al. | |
| 7,004,545 B2 | 2/2006 | Miller | |
| 7,040,705 B2 | 5/2006 | Clough | |
| 7,044,267 B2 * | 5/2006 | Sigler | A47C 16/00 182/15 |
| 7,325,868 B2 * | 2/2008 | West | A47C 16/00 297/4 |
| 7,543,891 B2 | 6/2009 | Chung | |
| 8,042,775 B1 | 10/2011 | Gallegos | |
| 8,256,049 B1 | 9/2012 | Sinks | |
| 8,708,414 B2 | 4/2014 | Hurwitz | |
| 8,746,801 B2 | 6/2014 | Nakata | |
| 8,814,106 B2 | 8/2014 | Aguilera | |
| 8,826,581 B2 * | 9/2014 | Boll | A01M 31/02 42/94 |
| 8,984,688 B1 | 3/2015 | Ibrahim | |
| 9,027,185 B2 | 5/2015 | Garcia et al. | |
| 9,226,587 B2 | 1/2016 | Halimi et al. | |
| 9,770,110 B1 | 9/2017 | Biggs | |
| 9,877,588 B2 * | 1/2018 | Belleh | B60N 2/806 |
| 9,888,793 B2 | 2/2018 | Walker et al. | |
| 9,986,838 B1 | 6/2018 | Biggs | |
| 10,159,354 B2 * | 12/2018 | Rayburn | A47C 16/00 |
| 10,172,468 B2 * | 1/2019 | Houghson | A47C 16/00 |
| 10,217,658 B2 | 4/2019 | Lange | |
| 2002/0050009 A1 * | 5/2002 | Ley | A47C 16/00 5/657 |
| 2005/0006941 A1 | 1/2005 | Park | |
| 2008/0240868 A1 * | 10/2008 | Bolton | E21D 15/52 405/288 |
| 2009/0165210 A1 | 7/2009 | Jett | |
| 2012/0030876 A1 | 2/2012 | Schwingendorf et al. | |
| 2013/0104274 A1 | 5/2013 | Zaouk et al. | |
| 2013/0152828 A1 * | 6/2013 | Chavira | A47B 23/043 108/12 |
| 2013/0221168 A1 | 8/2013 | Bernardoni | |
| 2014/0300169 A1 | 10/2014 | Dale et al. | |
| 2016/0081482 A1 * | 3/2016 | Schumacher | A47C 16/00 5/640 |
| 2016/0113407 A1 * | 4/2016 | Sampson | F16M 11/28 297/397 |
| 2017/0232874 A1 | 8/2017 | Blankenship | |
| 2018/0049568 A1 | 2/2018 | Cruz | |
| 2018/0116404 A1 | 5/2018 | Weinert | |
| 2018/0242750 A1 | 8/2018 | Wilson | |
| 2018/0103764 A1 | 10/2018 | Kellock et al. | |
| 2019/0038053 A1 | 2/2019 | Brantingham | |

FOREIGN PATENT DOCUMENTS

| | | |
|---|---|---|
| CN | 2710455 Y | 7/2005 |
| CN | 2877445 Y | 3/2007 |
| CN | 101711630 A | 5/2010 |
| CN | 201668143 U | 12/2010 |
| CN | 102090802 A | 6/2011 |
| CN | 104248258 A | 12/2014 |
| CN | 204541454 U | 8/2015 |
| CN | 205612136 U | 10/2016 |
| CN | 106063650 A | 11/2016 |
| CN | 206576595 U | 10/2017 |
| CN | 207444667 U | 6/2018 |
| CN | 207803879 U | 9/2018 |
| CN | 207949420 U | 10/2018 |
| CN | 108741873 A | 11/2018 |
| CN | 108784102 A | 11/2018 |
| CN | 108851717 A | 11/2018 |
| DE | 3445846 A1 | 9/1986 |
| DE | 4431109 C1 | 10/1995 |
| DE | 29914557 U1 | 1/2001 |
| DE | 29914557 U1 | 2/2001 |
| EP | 0285371 A1 | 10/1988 |
| EP | 1765118 B1 | 8/2008 |
| EP | 1898749 B1 | 10/2015 |
| EP | 3011871 A1 | 4/2016 |
| EP | 3042587 A1 | 7/2016 |
| EP | 1968412 B1 | 3/2017 |
| GB | 2313050 B | 1/2000 |
| GB | 2389509 A | 12/2003 |
| GB | 2389521 A | 12/2003 |
| GB | 2434302 A | 7/2007 |
| GB | 2480478 B | 4/2012 |
| GB | 2498795 A | 7/2013 |
| GB | 2518016 A | 3/2015 |
| GB | 2536662 A | 9/2016 |
| HK | 1203133 | 10/2015 |
| HK | 1204892 | 12/2015 |
| IN | 267976 B | 8/2015 |
| JP | 11018870 A | 5/1997 |
| JP | 11018870 A | 1/1999 |
| KR | 687186 B1 | 2/2007 |
| KR | 2009047590 A | 5/2009 |
| KR | 2009083757 A | 8/2009 |
| KR | 2018116730 A | 10/2018 |
| RU | 2427305 C1 | 8/2011 |
| RU | 177334 U1 | 2/2018 |
| RU | 2677355 C1 | 1/2019 |
| WO | 2010026588 A1 | 3/2010 |
| WO | 2011070523 A1 | 6/2011 |
| WO | 2012027949 A1 | 3/2012 |
| WO | 2013084005 A1 | 6/2013 |
| WO | 2013154411 A1 | 10/2013 |
| WO | 201706193 A2 | 1/2017 |
| WO | 2017006193 A2 | 1/2017 |
| WO | 2017083934 A1 | 5/2017 |

\* cited by examiner

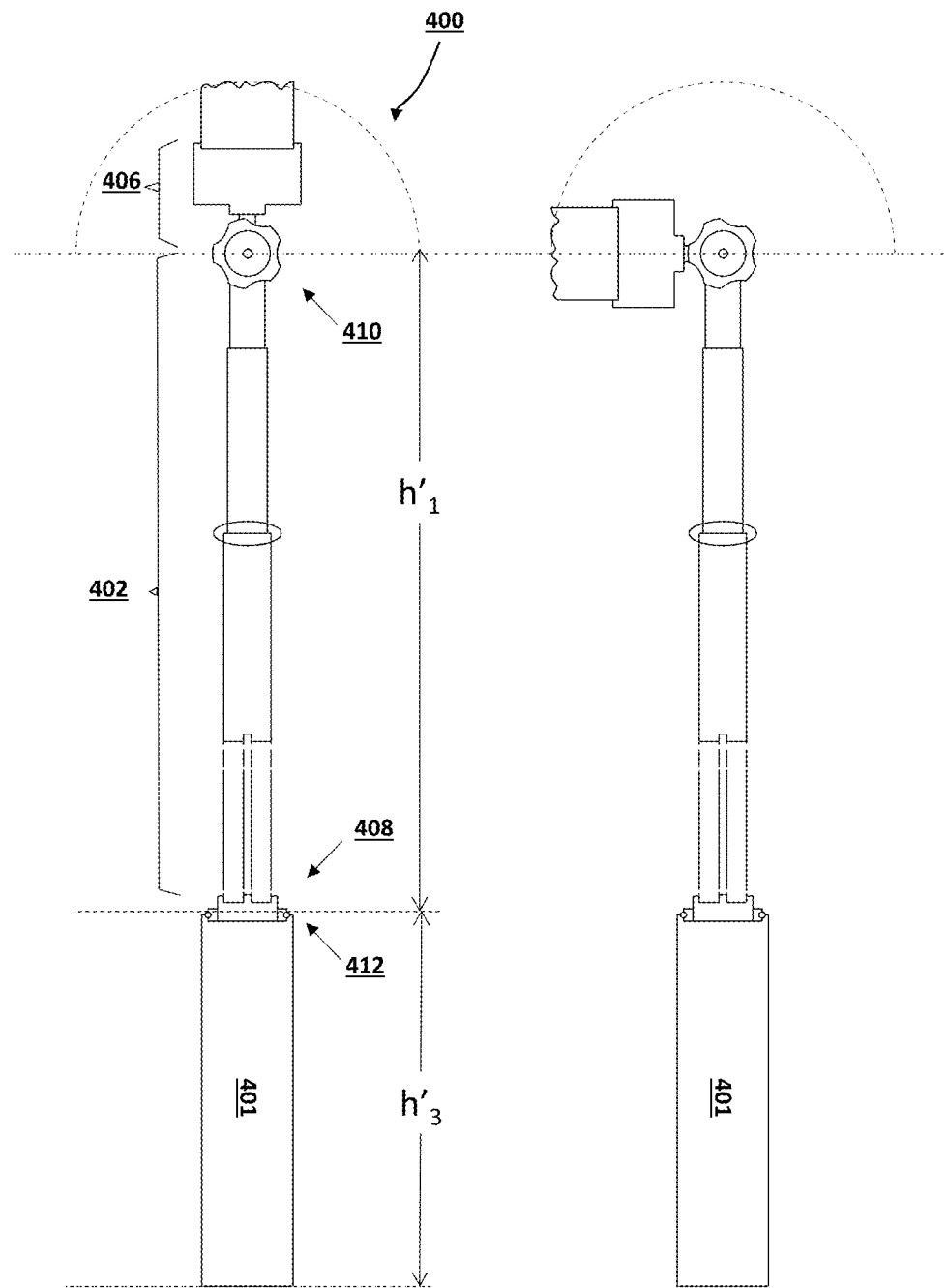
FIG. 4A FIG. 4B

MODULAR AND ADJUSTABLE HEADREST

BACKGROUND OF THE INVENTION

Field of Invention

The present invention relates generally to the field of headrests. More specifically, the present invention is related to a modular and adjustable headrest.

Discussion of Prior Art

A variety of head support devices have been proposed in the prior art. A sampling of the prior art in this field is shown in the following patent references: (1) U.S. Patent to W. W. Branner—U.S. Pat. No. 3,380,694 A, (2) U.S. Patent to L. Aguilera—U.S. Pat. No. 8,814,106 B2, (3) U.S. Patent to Biggs—U.S. Pat. No. 9,770,110 B1, and (4) PCT Publication to M. J. Webber—WO 2017/083934 A1.

The U.S. Patent to W. W. Branner (U.S. Pat. No. 3,380, 694 A) discloses a device for supporting the head of a person while resting in a reclining or substantially prone position, where the user is able to rest his/her chin upon it. Branner's disclosed device having a base, which may be temporarily fixed in or on the ground, and a head supporting upper portion which is formed with a central depression for accommodating the chin of the user, and a trough extending radially from the depression to the periphery of the support to accommodate his throat, adjacent his chin.

The U.S. Patent to L. Aguilera (U.S. Pat. No. 8,814,106 B2) discloses a travel head support device wherein Aguilera's device supports a user's head as, for example, they sleep while sitting substantially upright. Aguilera's head support device includes a chin support extension base that is coupled to a neck strap and an adjustable chin support assembly. The adjustable chin support assembly has a chin support pad base to support a user's chin and a chin support extension pivotably coupled to the chin support extension base such that the chin support extension solely pivots in one plane, away and towards the user's chin.

The U.S. Patent to Biggs (U.S. Pat. No. 9,770,110 B1) discloses a head support apparatus. Biggs' apparatus includes a tube and a rod configured to slidably and lockably couple to the tube. A cup and pad are coupled to an upper end of the rod. In use, a lower end of the tube bears on a support. A person's chin is rested on the pad whereby the weight of the person's head is supported by the head support apparatus.

The PCT Publication to Webber (WO 2017/083934 A1) discloses a head support device having a pedestal between a jaw support and a load transfer system supported on or by the person's body, wherein a first coupling is provided to couple the pedestal to the jaw support to enable user adjustable juxtaposition in one of a plurality of positions and a second coupling is provided for a quick release connection between the pedestal and the load transfer system.

Whatever the precise merits, features, and advantages of the above cited references, none of them achieves or fulfills the purposes of the present invention.

SUMMARY OF THE INVENTION

In one embodiment, the present invention provides a headrest comprising: (a) a vertically adjustable element having a lower end and an upper end, the vertically adjustable element having a height, $h_1$, when fully extended and having a height, $h_2$, when collapsed, where $h_2<h_1$; (b) an adjustable lap rest element having a first portion that is attached to the lower end of the vertically adjustable element and having a second portion comprising a pair of fold-outs, each fold-out having dimension $h_3$, the fold-outs, in a horizontal configuration, function as a lap rest, and the fold-outs, in a vertical configuration, function to increase the height of the headrest, when fully extended, from the height, $h_1$, to height $h_1+h_3$; and (c) a cup element attached to the upper end of the vertically adjustable element, the cup element comprising a cup and an angularly adjustable mechanism to angularly adjust the cup.

In another embodiment, the present invention provides a modular headrest kit comprising: (a) a first element comprising a vertically adjustable element and a cup element, the vertically adjustable element having a lower end and an upper end, the vertically adjustable element having a height, $h_1$, when fully extended and having a height, $h_2$, when collapsed, where $h_2<h_1$, the vertically adjustable element stored in the kit in collapsed form; the cup element attached to the upper end of the vertically adjustable element, the cup element comprising a cup and an angularly adjustable mechanism to angularly adjust the cup; (b) a second element comprising an adjustable lap rest element having a first portion that is attachable to the lower end of the vertically adjustable element and having a second portion comprising a pair of fold-outs, each fold-out having dimension $h_3$, the fold-outs capable of being in a horizontal configuration to function as a lap rest, and the fold-outs capable of being in a vertical configuration to increase the height of the headrest, when fully extended, from the height, $h_1$, to height $h_1+h_3$; and wherein the adjustable lap rest element is stored in the kit in the vertical configuration detached from the first element, and (c) a case to store the first and second elements.

BRIEF DESCRIPTION OF THE DRAWINGS

FIGS. 4A-B depict another embodiment of the present invention without the adjustable lap rest element.

DESCRIPTION OF THE PREFERRED EMBODIMENTS

Figure 1:
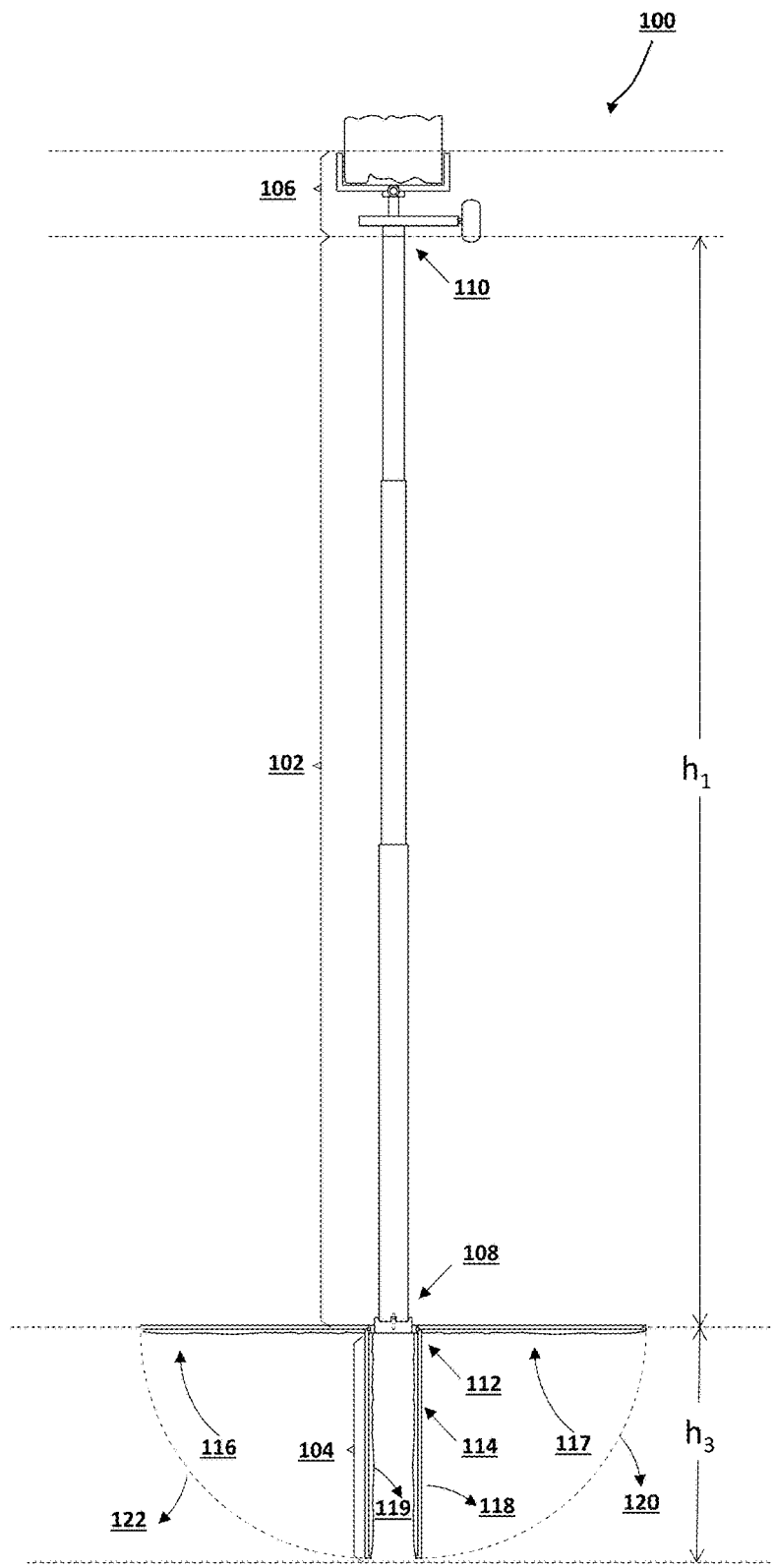
FIG. 1 illustrates one embodiment of the present invention's headrest.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates one embodiment of the present invention's headrest. The headrest 100 comprises: a vertically adjustable element 102, an adjustable lap rest element 104, and a cup element 106.

The vertically adjustable element 102 has a lower end 108 and an upper end 110.

Figure 2:
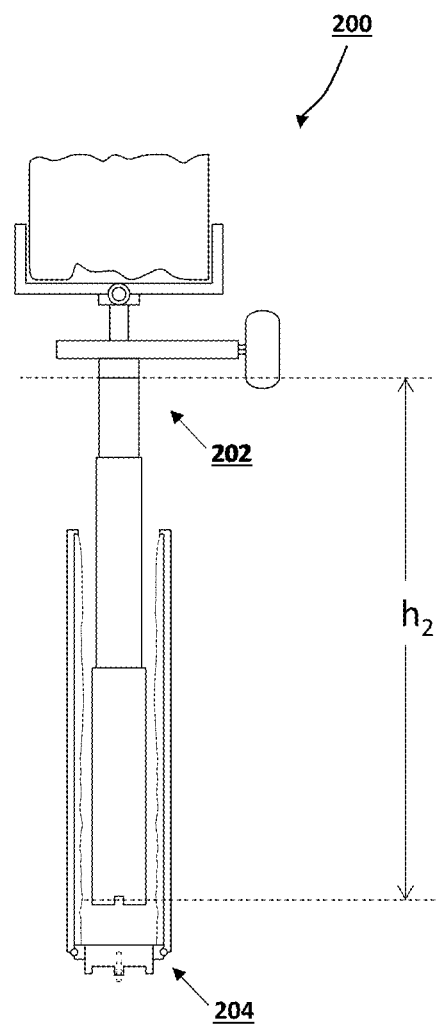
FIG. 2 depicts a kit for selling the headrest shown in FIG. 1.

The vertically adjustable element 102 having a height, $h_1$, when fully extended (as shown in FIG. 1, fully extended) and having a height, $h_2$, when collapsed (as shown in FIG. 2), where $h_2 < h_1$. In one embodiment, the vertically adjustable element is made from aluminum.

The adjustable lap rest element 104 has a first portion 112 that is attached to the lower end 108 of the vertically adjustable element 102 and having a second portion comprising a pair of fold-outs 114, each fold-out having a dimension $h_3$. The fold-outs 114, in a horizontal configuration (as shown by arrows 116 and 117), function as a lap rest. The fold-outs 114, in a vertical configuration (as indicated by arrows 118 and 119), function to increase the height of the headrest, when fully extended, from the height, $h_1$, to height $h_1 + h_3$. It should be noted that the fold-outs 114 are shown in both the vertical and horizontal configurations in FIG. 1 for illustration purposes only, as the fold-outs 114 are both either in the vertical configuration or in the horizontal configuration, but not both. The fold-outs 114 may each be moved out from the vertical configuration to the horizontal configuration over the arc indicated by arrows 120 and 122. In one embodiment, the adjustable lap rest elements and the padding for the lap may be made from plastic.

The cup element 106 is attached to the upper end 110 of the vertically adjustable element 102. The cup element comprises a cup and an angularly adjustable mechanism to angularly adjust the cup. In one embodiment, the cup is made from plastic and foam cushion. In one embodiment, the angularly adjustable mechanism is a ball and socket joint.

In another embodiment, the cup element is angularly adjustable in all three dimensions. In yet another embodiment, the cup element is angularly adjustable in two dimensions (e.g., the X-Y plane, to rotate a span of 180 degrees).

In one embodiment, the vertically adjustable element comprises a plurality of telescoping tubes.

In one embodiment, the first portion 112 is attached to the lower end 108 of the vertically adjustable element 102 via a snap-fit arrangement. Other arrangements are also envisioned for attaching the first portion 112 to the lower end 108 of the vertically adjustable element 102. For example, a slide on mechanism or a screw-on mechanism are envisioned for attaching the first portion 112 to the lower end 108 of the vertically adjustable element 102. Alternatively, in a permanently fixed embodiment, the first portion 112 and the lower end 108 of the vertically adjustable element are permanently fixed to each other.

In one embodiment, the angularly adjustable mechanism is an adjustable ball and socket joint.

In one embodiment, the cup element 106 is foam-padded. A fully adjustable foam-padded chin rest allows for the widest number of physiological needs including height, weight, posture, chin structure, and general user preference. The foam-padded chin rest tilts on the fully adjustable head 180 degrees and rotates 360 degrees and locks into place with a tightening bolt.

In one embodiment, the headrest further comprises a clip fastened onto the vertically adjustable element for attaching to a safety belt. The clip may be fastened onto the vertically adjustable element in order to accommodate situations where it is not possible for the base (formed by the fold-outs) to reach a stable surface. This clip is designed to attach snugly to most vehicle and aircraft safety belts, or personal belts worn by some individuals.

In one embodiment, the cup element 106 is attached to the upper end 110 of the vertically adjustable element 102 via a snap-fit arrangement.

In one embodiment, the cup element 106 and the vertically adjustable element 102 may be provided as one unit.

In one embodiment, the present invention provides a kit for selling the headrest device shown in FIG. 1. FIG. 2 depicts such a kit 200. In this embodiment, the present invention provides a modular headrest kit comprising: (a) a first element 202 comprising a vertically adjustable element and a cup element, the vertically adjustable element having a lower end and an upper end, the vertically adjustable element having a height, $h_1$, when fully extended and having a height, $h_2$, when collapsed, where $h_2 < h_1$, the vertically adjustable element stored in the kit in collapsed form; the cup element attached to the upper end of the vertically adjustable element, the cup element comprising a cup and an angularly adjustable mechanism to angularly adjust the cup; and (b) a second element 204 comprising an adjustable lap rest element having a first portion that is attachable to the lower end of the vertically adjustable element and having a second portion comprising a pair of fold-outs, each fold-out having dimension $h_3$, the fold-outs, capable of being in a horizontal configuration to function as a lap rest, and the fold-outs capable of being in a vertical configuration to increase the height of the headrest, when fully extended, from the height, $h_1$, to height $h_1 + h_3$; and wherein the adjustable lap rest element is stored in the kit in the vertical configuration detached from the first element, and a case to store the first and second elements.

Figure 3A:
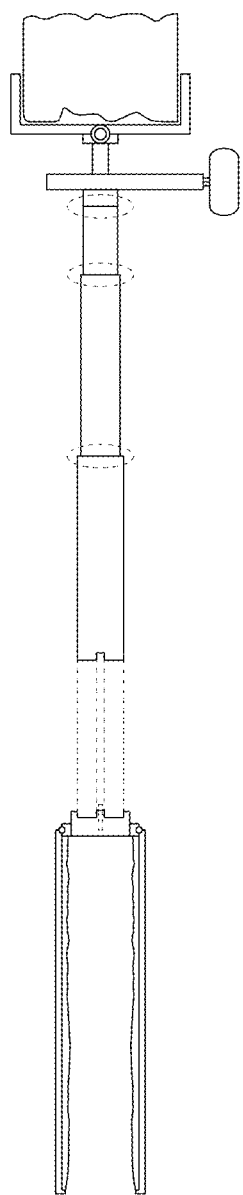
FIG. 3A depicts how the second element comprising the adjustable lap rest element from the kit in FIG. 2 is attached to the first element in FIG. 2.
Figure 3B:
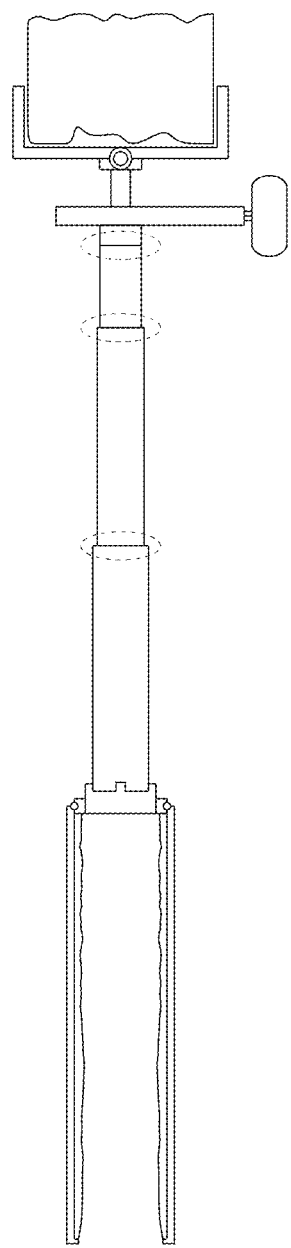
FIG. 3B depicts the assembled headrest device put together from the kit of FIG. 2.

FIG. 3A depicts how the second element comprising the adjustable lap rest element from the kit in FIG. 2 is attached to the first element in FIG. 2. FIG. 3B depicts the assembled headrest device put together from the kit.

FIGS. 4A-B depict another embodiment of the present invention without the adjustable lap rest element. In FIGS. 4A-B, the adjustable lap rest element 104 of FIG. 1 is replaced with a holder unit 401. In the embodiment shown in FIGS. 4A-B, headrest 400 comprises: a vertically adjustable element 402, a holder unit 401, and a cup element 406.

Figure 5:
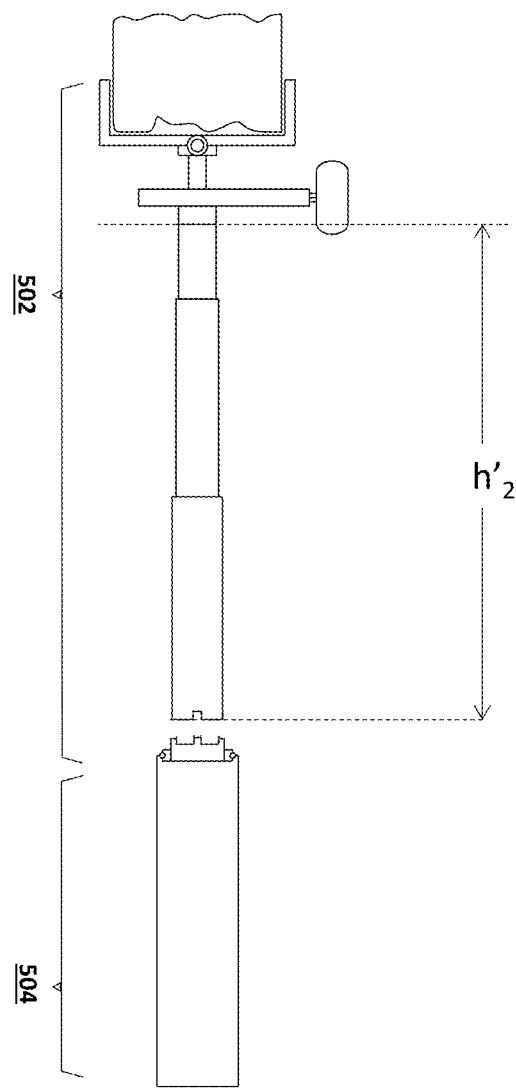
FIG. 5 depicts a kit for selling the headrest shown in FIGS. 4A-B.

The vertically adjustable element 402 has a lower end 408 and an upper end 410. Similar to FIG. 1, the vertically adjustable element 402 having a height, $h'_1$, when fully extended (as shown in FIG. 4A, fully extended) and having a height, $h'_2$, when collapsed (as shown in FIG. 5), where $h'_2 < h'_1$. In one embodiment, the vertically adjustable element is made from aluminum.

The holder unit 401 has a height $h'3$ and has a first portion 412 that is attached to the lower end 408 of the vertically adjustable element 402. In one embodiment, the holder unit 401 is made from plastic.

The cup element 406 is attached to the upper end 410 of the vertically adjustable element 402. The cup element comprises a cup and an angularly adjustable mechanism to angularly adjust the cup. In one embodiment, the cup is made from plastic and foam cushion. In one embodiment, the angularly adjustable mechanism is a ball and socket joint. In another embodiment, the cup element is angularly adjustable in all three dimensions. In yet another embodiment, as shown in FIGS. 4A-B, the cup element is angularly adjustable in two dimensions (e.g., the X-Y plane, to rotate a span of 180 degrees).

In one embodiment, the vertically adjustable element 402 comprises a plurality of telescoping tubes.

In one embodiment, the first portion 412 is attached to the lower end 408 of the vertically adjustable element 402 via a snap-fit arrangement. Other arrangements are also envisioned for attaching the first portion to the lower end of the vertically adjustable element. For example, a slide on mechanism, a screw-on mechanism, or a permanently fixed embodiment (where the first portion and the lower end of the vertically adjustable element are permanently fixed to each other).

In one embodiment, the angularly adjustable mechanism is an adjustable ball and socket joint.

In one embodiment, the cup is foam-padded. A fully adjustable foam-padded chin rest allows for the widest number of physiological needs including height, weight, posture, chin structure, and general user preference. The foam-padded chin rest tilts on the fully adjustable head 180 degrees and rotates 360 degrees and locks into place with a tightening bolt.

In one embodiment, the headrest further comprises a clip fastened onto the vertically adjustable element for attaching to a safety belt. The clip may be fastened onto the vertically adjustable element in order to accommodate situations where it is not possible for the base (formed by the fold-outs) to reach a stable surface. This clip is designed to attach snugly to most vehicle and aircraft safety belts, or personal belts worn by some individuals.

In one embodiment, the cup element 406 is attached to the upper end 410 of the vertically adjustable element 402 via a snap-fit arrangement.

In one embodiment, the cup element 406 and the vertically adjustable element 402 may be provided as one unit.

FIG. 4A depicts the cup element 406 in a vertical orientation and FIG. 4B depicts the cup element 406 moved, via the angularly adjustable mechanism, to a horizontal orientation.

In one embodiment, the device depicted in FIGS. 4A-B may be sold as a kit. An example of such a kit is illustrated in FIG. 5. In this embodiment, the present invention provides a modular headrest kit comprising: (a) a first element 502 comprising a vertically adjustable element and a cup element, the vertically adjustable element having a lower end and an upper end, the vertically adjustable element having a height, $h'_1$, when fully extended and having a height, $h'_2$, when collapsed, where $h'_2<h'_1$, the vertically adjustable element stored in the kit in collapsed form; the cup element attached to the upper end of the vertically adjustable element, the cup element comprising a cup and an angularly adjustable mechanism to angularly adjust the cup; and (b) a second element 504 comprising a holder unit has a height $h'_3$ and has a first portion that is attached to the lower end of the vertically adjustable element. Elements 502 and 504 may be stored in a case, which may be provided as part of the kit.

CONCLUSION

The above embodiments depict an effective implementation of a modular and adjustable headrest. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

The invention claimed is:

1. A headrest comprising:
   a. a vertically adjustable element having a lower end and an upper end, the vertically adjustable element having a height, $h_1$, when fully extended and having a height, $h_2$, when collapsed, where $h_2<h_1$;
   b. an adjustable lap rest element having a first portion that is attached to the lower end of the vertically adjustable element and having a second portion comprising a pair of fold-outs, each fold-out having dimension $h_3$,
      the fold-outs, in a horizontal configuration, function as a lap rest, and
      the fold-outs, in a vertical configuration, function to increase the height of the headrest, when fully extended, from the height, $h_1$, to height $h_1+h_3$; and
   c. a foam-padded, adjustable, chin rest, the foam-padded, adjustable, chin rest attached to the upper end of the vertically adjustable element, the foam-padded, adjustable, chin rest comprising a cup and an angularly adjustable mechanism to angularly adjust the cup, the angularly adjustable mechanism of the chin rest allowing adjustment 180 degrees in one axis and allowing rotation of 360 degrees in another axis and locks into place with a tightening bolt.

2. A method of using a headrest, the headrest comprising a vertically adjustable element, an adjustable lap rest element, and a cup element, the method comprising:
   (a) extending the vertically adjustable element from a collapsed state to a fully extended state, the vertically adjustable element having a height, $h_1$, when fully extended and having a height, $h_2$, when collapsed, where $h_2<h_1$, the vertically adjustable element having a lower end and an upper end;
   (b) adjusting the adjustable lap rest element to either a horizontal configuration or a vertical configuration, the adjustable lap rest element having a first portion that is attached to the lower end of the vertically adjustable element and having a second portion comprising a pair of fold-outs, each fold-out having dimension $h_3$, the fold-outs, in the horizontal configuration, function as a lap rest, and the fold-outs, in the vertical configuration, function to increase the height of the headrest, when fully extended, from the height, $h_1$, to height $h_1+h_3$; and
   (c) placing a chin on the cup element, the cup element comprising a foam-padded, adjustable, chin rest, the cup element attached to the upper end of the vertically adjustable element, the cup element comprising a cup and an angularly adjustable mechanism to angularly adjust the cup.

3. The method of claim 2, wherein the vertically adjustable element comprises a plurality of telescoping tubes.

4. The method of claim 2, wherein the first portion is attached to the lower end of the vertically adjustable element via any of the following: a slide on arrangement, a screw-on arrangement, or a snap-fit arrangement.

5. The method of claim 2, wherein the angularly adjustable mechanism is an adjustable ball and socket joint.

6. The method of claim 2, wherein the cup element is attached to the upper end of the vertically adjustable element via a snap-fit arrangement.

7. The method of claim 2, wherein the vertically adjustable element is made from aluminum.

8. The method of claim 2, wherein the adjustable lap rest element is made from plastic.

9. A method for using a modular headrest kit comprising a first element, a second element, and a case to store the first and second elements, the first element comprising a vertically adjustable element and a, foam padded, cup element, the method comprising:
   (a) removing the first element and second element from the case;

(b) attaching the first element to the second element;

(c) extending the vertically adjustable element from a collapsed state to a fully extended state, the vertically adjustable element having a height, $h_1$, when fully extended and having a height, $h_2$, when collapsed, where $h_2<h_1$, the vertically adjustable element stored in the kit, prior to its removal, in collapsed form, the vertically adjustable element having a lower end and an upper end;

(d) adjusting the second element to either a horizontal configuration or a vertical configuration, the second element comprising an adjustable lap rest element having a first portion that is attached to the lower end of the vertically adjustable element and having a second portion comprising a pair of fold-outs, each fold-out having dimension $h_3$, the fold-outs capable of being in the horizontal configuration to function as a lap rest, and the fold-outs capable of being in the vertical configuration to increase the height of the headrest, when fully extended, from the height, $h_1$, to height $h_1+h_3$; and wherein the adjustable lap rest element is stored in the kit in the vertical configuration detached from the first element, wherein the attaching, in step (b), is attaching the first portion of the adjustable lap rest to the lower end of the vertically adjustable element, and (e) placing a chin on the cup element attached to the upper end of the vertically adjustable element, the cup element comprising a cup and an angularly adjustable mechanism to angularly adjust the cup.

10. The method of claim 9, wherein the vertically adjustable element comprises a plurality of telescoping tubes.

11. The method of claim 9, wherein the first portion is attached to the lower end of the vertically adjustable element via a snap-fit arrangement.

12. The method of claim 9, wherein the angularly adjustable mechanism is an adjustable ball and socket joint.

13. The method of claim 9, wherein the cup element is attached to the upper end of the vertically adjustable element via a snap-fit arrangement.

14. The method of claim 9, wherein the first element is made from aluminum.

15. The method of claim 9, wherein the second element is made from plastic.

\* \* \* \* \*